2,913,479
Patented Nov. 17, 1959

2,913,479

HALOALKANESULFENYL HALIDE REACTION PRODUCT

Samuel Allen Heininger and Gail H. Birum, Dayton, Ohio, assignors to Monsanto Chemical Company, St. Louis, Mo., a corporation of Delaware No Drawing. Application February 21, 1957
Serial No. 641,473

3 Claims. (Cl. 260—465.7)

This invention relates to reaction products of haloalkanesufenyl halides with $\alpha,\beta$-olefinically unsaturated nitriles.

The $\alpha,\beta$-olefinically unsaturated nitriles are known to be resistant to reaction with sulfenyl halides. Thus, e.g., as reported by Kharasch and Buess, J. Am. Chem. Soc. (1949), volume 71, page 2726, first column, whereas adducts of dinitrobenzenesulfenyl chloride with a number of different olefinic compounds have been prepared successfully by these workers, they found it impossible to effect the reaction of this sulfenyl halide with acrylonitrile. Turner and Connor, J. Am. Chem. Soc. (1947), 69, 1009, similarly report failure to produce addition of 4-chloro-2-nitrobenzenesulfenyl chloride and 4-nitrobenzenesulfenyl chloride to compounds in which the double bond was conjugated with a carbonyl, carbethoxyl or cyano group. Our own experiments have confirmed this finding that nitrobenzenesulfenyl halides do not react with acrylonitrile under conditions normally leading to adduct formation when the sulfenyl halide is contacted with other olefins. When have further made repeated attempts to react acrylonitrile with perchloromethyl mercaptan, a sulfenyl halide of the formula $Cl_3CSCl$, which is known to be highly reactive and to undergo ready reaction with a variety of unsaturated organic compounds, without success.

It is accordingly highly surprising that, as has now been found, $\alpha,\beta$-olefinically unsaturated nitriles undergo ready reaction with haloalkanesulfenyl halides wherein at least 1-hydrogen atom is present on the carbon atom attached to the sulfenyl halide radical, forming reaction products consisting of compounds containing divalent sulfur atoms and nitrile radicals.

The presently preferred $\alpha,\beta$-olefinically unsaturated nitriles are nitriles of the formula RCH=CRCN where R represents hydrogen or a hydrocarbon radical free of aliphatic unsaturation and containing from 1 to 6 carbon atoms, provided that at least one R represents hydrogen. By aliphatic unsaturation is here meant carbon-to-carbon, olefinic or acetylenic, unsaturation. Acrylonitrile, where each R represents a hydrogen atom, is the particularly preferred member of this series, but the present reaction also proceeds with facility with terminally unsaturated nitriles such as methacrylonitrile, 2-ethylacrylonitrile, 2-neopentylacrylonitrile, 2-cyclohexylacrylonitrile, 2-phenylacrylonitrile, etc. It may also be applied to $\beta$-hydrocarbylacrylonitriles such as crotononitrile, cinnamonitrile, 3-cyclohexylacrylonitrile, etc.

The presently preferred class of haloalkanesulfenyl halides which undergo reaction with $\alpha,\beta$-olefinically unsaturated nitriles in accordance with this invention are the halogen-substituted lower alkanesulfenyl chlorides and bromides, where said halogen atoms are chlorine or bromine atoms, and wherein at least 1 hydrogen atom is present on the carbon atom attached to the sulfenyl halide radical. Sulfenyl halides are generally prepared by halogenation of symmetrical disulfide compounds. In the case of the aliphatic disulfides, if halogenation is continued after the formation of the sulfenyl halide from the disulfide, chlorine or bromine atoms are introduced onto the aliphatic carbon atoms. The presently preferred class of haloalkanesulfenyl halides having at least 1 hydrogen atom present on the carbon atom attached to the sulfenyl halide radical may be prepared by such a halogenation process, wherein disulfides are halogenated with chlorine or bromine to the extent that halogen atoms are introduced onto the aliphatic carbon atoms, said halogenation being discontinued at a point where hydrogen atoms still remain attached to the carbon atom attached to the sulfenyl halide radical. Exemplary of sulfenyl halides useful in the present process are, e.g., monochloromethanesulfenyl chloride, dichloromethanesulfenyl chloride, dibromomethanesulfenyl bromide, 2-chloroethanesulfenyl chloride, 2-bromoethanesulfenyl chloride, 1-chloro-2-bromoethanesulfenyl chloride, 4-chlorobutanesulfenyl chloride, 1-chlorobutanesulfenyl chloride, 1,2,2-trichlorobutanesulfenyl chloride, 5-chloropentanesulfenyl chloride, 3,4,5,5,5-pentachlorohexanesulfenyl chloride, etc.

When a haloalkanesulfenyl halide as defined above is contacted with one of the presently useful class of olefinically-unsaturated nitriles, there is formed a reaction product consisting of compounds containing sulfur atoms and nitrile radicals. We believe the primary reaction to be formation of an adduct, as illustrated by the following equation

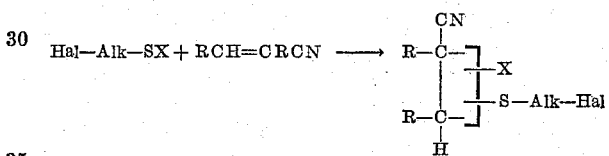

where RCH=CRCN represents an $\alpha,\beta$-olefinic nitrile as defined above, and Hal-Alk-SX represents a halogenated alkanesulfenyl halide of the presently useful variety. Surprisingly, by comparison to other addition reactions of acrylonitrile wherein addition of the negatively charged radical occurs exclusively on the beta carbon atom, the reaction of a sulfenyl halide with acrylonitrile or a $\beta$-hydrocarbylacrylonitrile appears to give a mixture of isomeric adducts, together with unsaturated compounds. When an $\alpha$-hydrocarbyl-acrylonitrile such as methacrylonitrile is employed, the formation of a single isomer is indicated, but the identity of this isomer has proven difficult to establish, and formation of a mixture of isomeric 2-halo-3-thio and 3-halo-2-thio nitriles is not excluded. Isolation of the reaction products is complicated by dehydrohalogenation and rearrangement thereof.

The present process whereby adducts of the above structure are obtained is particularly valuable since nitriles simultaneously substituted by a halogen atom and a haloalkylthio group do not appear to have been known hitherto.

Our present products having the adduct structure as shown above may be characterized as 3(2)-halo-2(3)-(haloalkylthio)-alkanenitriles, whereby such nomenclature is means a 3-halo-2-(haloalkylthio)alkanenitrile and/or 2-halo-3-(haloalkylthio)-alkanenitrile. Thus, the adduct of dichloromethanesulfenyl chloride and acrylonitrile is named as 3(2)-chloro-2(3)-(dichloromethylthio)-propionitrile, whereby is meant 3-chloro-2-(dichloromethylthio)-propionitrile and/or 2-chloro-3-(dichloromethylthio)propionitrile.

Exemplary of the adducts which may be obtained from acrylonitrile and haloalkanesulfenyl halides in accordance with this invention are 3(2)-chloro-2(3)-(chloromethylthio)propionitrile, 3(2)-chloro-2(3)-(dichloromethylthio)propionitrile, 3(2)-bromo-2(3)-(dibromomethylthio)propionitrile, (3(2)-chloro-2(3)-(trichloroethylthio)propionitrile, 3(2) - chloro - 2(3)-(pentachloroamylthio)propionitrile, etc.

The products of reaction of β-hydrocarbyl-acrylonitriles, like those of acrylonitrile, are obtained as complex reaction mixtures, which as noted above, appear to contain mixtures of both possible isomeric adducts and also generally contain unsaturated products. Exemplary of the adducts obtained by reaction of a β-hydrocarbyl-acrylonitrile and a haloalkanesulfenyl chloride in accordance with this invention are 3(2)-chloro-2(3)-(chloromethylthio)butyronitrile, 3(2) - chloro - 2(3)-(dichloromethylthio)-3-phenylpropionitrile, 3(2)-chloro-2(3)-(trichloroethylthio)-3-cyclohexylpropionitrile, etc.

A further class of the present reaction products consists of those derived from α-hydrocarbyl-substituted acrylonitriles, and conforming to the above adduct formula, e.g., 3(2) - chloro-2(3)-(chloromethylthio)-2-methylpropionitrile, 3(2) - chloro - 2(3) - (dichloromethylthio)-2-methylpropionitrile, 3(2) - bromo-2(3)-(dichloromethylthio) - 2 - methylpropionitrile, 3(2)-chloro-2(3)-(1,2-dichloroethylthio)-2-methylpropionitrile, 3(2)-chloro-2(3)-(dichloromethylthio)-2-hexylpropionitrile, 3(2) - chloro-2(3)-(dichloromethylthio)-2-phenylpropionitrile, etc.

It will be appreciated that the present adducts contain an asymmetric carbon atom, and each position isomer is obtained as a racemic mixture of optical isomers, which may be resolved into individual d- and l-isomers.

Although the present reaction products are believed to contain adducts as described above, there are also apparently present therein additional thio-substituted nitriles, not having the adduct structure, and possibly resulting from secondary reactions, and the present adducts have proved refractory to attempted isolation thereof. Furthermore, the reaction product of an olefinic nitrile with a sulfenyl halide exhibits behavior, e.g., on oxidation, which does not conform in certain respects to the expected reactions of the products predicted to be present therein. Accordingly, we prefer not to be bound by speculation, but to claim the present reaction products as such, as new compositions of matter.

In carrying out the present reaction, a haloalkanesulfenyl halide as defined above is simply contacted with one of the presently useful class of olefinically-unsaturated nitriles until there is formed a reaction product consisting of compounds containing sulfur atoms and nitrile radicals. Heating and/or catalysts are desirably employed to accelerate the reaction, with pairs of reactants which react sluggishly; in other cases, the sulfenyl halide may react with the olefinic nitrile in an exothermic reaction, requiring cooling and/or diluents to moderate its rate. Suitable inert solvents and diluents which may be employed in the reaction mixture, if desired, include hydrocarbons such as benzene or hexane, halogenated solvents such as chloroform or ethylene dibromide, oxygenated solvents free of active hydrogen, such as ether, etc. A particularly preferred class of solvents are anhydrous organic carboxylic acids, e.g., glacial acetic acid; this solvent also has the advantage of acting as a catalyst for the reaction. Mixtures of carboxylic acid and solvents may also be used as a reaction medium if desired.

To accelerate the rate of reaction when desired, heating and catalysts are employed. Suitable temperatures for carrying out the reaction comprise, e.g., the reflux temperature of the reaction mixture. Acid catalysts which may be employed in the present reaction, in addition to the organic carboxylic acid catalysts mentioned above are, e.g., Friedel-Crafts catalysts such as aluminum trichloride or boron trifluoride complexes. Pressure variation may also be utilized to facilitate the conduct of the reaction, e.g., by carrying out the reaction in a pressure-resistant vessel under autogenous pressure and at elevated temperatures.

Since unsaturated nitriles, and especially acrylonitrile, are susceptible to thermal polymerization, the reaction is preferably conducted in the presence of polymerization inhibitors. Examples of suitable polymerization inhibitors are, e.g., hydroquinone, the monomethyl ether of hydroquinone, methylene blue, copper carbonate, selenium dioxide, etc.

The time required to accomplish the reaction depends on functional factors such as the reactivity of the α,β-olefinic nitrile and the sulfenyl halide, the temperature of reaction, the presence or absence of catalysts, etc. Reaction rates and times of reactions may vary considerably, depending on details of apparatus and other operational conditions. By modification of the apparatus, continuous procedures may be substituted for the batch-type operations described below.

Conveniently, the course of the reaction may be followed by observing the change in color of the reaction mixture. Sulfenyl halides are generally a deep red shade; as the reaction with the nitrile proceeds, the color of the reaction mixture generally lightens gradually, usually reaching a clear yellow or orange tone by the time all the sulfenyl halide is reacted.

On completion of the reaction, the product may be separated by conventional methods, e.g., by evaporating off solvents, by distilling off or washing out catalysts, unreacted starting material, etc.

As illustrative of the process of the invention, there are described the following non-limiting exemplary operations.

*Example 1*

This example describes attempted addition of perchloromethyl mercaptan to acrylonitrile.

When a mixture of 371.6 g. (2.0 moles) of perchloromethyl mercaptan, 200 ml. of glacial acetic acid, and 106 g. (2.0 moles) of acrylonitrile was refluxed (96–97° C.) overnight, no reaction occurred, and all of the acrylonitrile was recovered unchanged.

Heating a mixture of 185.8 g. (1.0 mole) of perchloromethyl mercaptan, 53 g. (1.0 mole) of acrylonitrile, and 5 ml. of boron trifluoride etherate at 130° C. for 5 hours in an autoclave gave a reaction product consisting mostly of a black tar, together with a red liquid having an analytical composition corresponding approximately to unchanged $Cl_3CSCl$.

In attempted reaction of perchloromethyl mercaptan with acrylonitrile in the presence of boron trifluoride etherate at atmospheric pressure, none of the desired reaction product was obtained, and the acrylonitrile was found to undergo no reaction.

*Example 2*

To 45.2 g. (0.3 mole) of dichloromethanesulfenyl chloride were added 100 ml. of glacial acetic acid and 26.5 g. (0.5 mole) of acrylonitrile. The reaction mixture was held at about 70° C. for 2 hours, and then heated to reflux for 5 hours. The resulting black solution was distilled and there were collected 8.4 g. of reaction product, $n_D^{25}$ 1.5676, b. 95–100° C./2.0–2.5 mm., which contained 24% sulfur, 13% carbon, and 2.26% nitrogen according to elementary analysis. The infrared spectrum of this reaction product exhibited a doublet in the band corresponding to the nitrile radical, which indicates the presence of two different types of nitrile compound in the reaction mixture, and also contained bands corresponding to olefinic C=C— unsaturation.

When chloromethanesulfenyl chloride is heated with methacrylonitrile in the presence of glacial acetic acid, there is recovered a reaction product having an elemental composition corresponding approximately to that of the adduct thereof, 3(2)-chloro-2(3)-(chloromethylthio)-2-methylpropionitrile.

By refluxing a mixture of dichloromethanesulfenyl chloride with cinnamonitrile in glacial acetic acid, there is obtained a reaction product consisting of compounds containing sulfur atoms and nitrile radicals, and exhibiting olefinic unsaturation.

To the best of our knowledge, the presently provided reaction products of sulfenyl halides with nitriles of the above formula are complex mixtures of isomeric saturated and unsaturated compounds, as indicated hereinabove. The constituents are difficultly separable and the composition of the present reaction products has not been precisely established. The reaction products have fungicidal and bactericidal properties and are useful as constituents of microbiological toxicant compositions. This utility is illustrated by incorporating the reaction product of dichloromethanesulfenyl chloride with acrylonitrile in sterile agar at a concentration of 0.1%, whereby the agar is rendered incapable of supporting the growth of colonies of species such as *Micrococcus pyogenes* var. *aureus*, *Salmonella typhosa* and *Aspergillus niger* when inoculated therewith. The present reaction products may also be incorporated in the habitat of nematodes such as *Penagrellus redivivus* or Meloidogyne sp., at concentrations on the order of from 0.1% to 0.01% to control such nematodes, and are also useful as insecticides, herbicides, etc. In addition to the direct addition of the present reaction products to the habitat supporting the undesirable pest life, they may also be diluted with organic solvents; admixed with surface-active agents, with or without the addition of organic solvents, to prepare concentrates which can be diluted with water to give aqueous dispersions or emulsions or incorporated with finely divided inert powders, to form toxic compositions for application to pest habitats or to pest species. The present reaction products may be utilized to render organic substrates resistant to microbiological attack, e.g., they may be applied on leather, cloth, etc., or added to paints and lacquers, starch pastes, creams, and so forth.

It is also contemplated that the presently provided sulfur-containing reaction products of $\alpha,\beta$-olefinic nitriles, e.g., acrylonitrile, with a haloalkanesulfenyl halide may be converted by oxidation (e.g., with hydrogen peroxide in acetic acid, potassium permanganate, chromic acid, etc.) into the corresponding sulfoxides and sulfones.

While the present invention has been illustrated with reference to specific materials and processes, it will be appreciated that other embodiments of the invention may be made as defined in the appended claims.

What is claimed is:

1. The reaction product of equimolar amounts of a halogen-substituted alkanesulfenyl halide having halogen substituents selected from the class consisting of bromine and chlorine, not more than 6 carbon atoms, and at least one hydrogen atom on the carbon atom attached to the sulfenyl halide radical, with an $\alpha,\beta$-olefinically unsaturated nitrile of the formula RCH=CRCN wherein R is a substituent selected from the class consisting of hydrogen and hydrocarbon radicals free of aliphatic unsaturation and containing between 1 and 6 carbon atoms provided that at least one R represents hydrogen, said reaction product being a mixture of compounds having divalent sulfur atoms, halogen substituents selected from the class consisting of bromine and chlorine, and nitrile radicals.

2. The reaction product of equimolar amounts of a chloro-substituted alkanesulfenyl chloride having not more than 6 carbon atoms and at least one hydrogen atom on the carbon atom attached to the sulfenyl chloride radical, with acrylonitrile, said reaction product being a mixture of compounds having divalent sulfur atoms, chlorine atoms and nitrile radicals.

3. The reaction product of equimolar amounts of dichloromethanesulfenyl chloride with acrylonitrile, said reaction product being a mixture of compounds having divalent sulfur atoms, chlorine atoms and nitrile radicals.

References Cited in the file of this patent

UNITED STATES PATENTS 2,568,859     Ladd et al.     Sept. 25, 1951
2,725,411     Ladd et al.     Nov. 29, 1955

OTHER REFERENCES

Brintzinger et al.: Angew. Chemie, vol. 64, p. 398 (1952).